(12) United States Patent
Lochmann et al.

(10) Patent No.: US 10,415,497 B2
(45) Date of Patent: Sep. 17, 2019

(54) ARRANGEMENT FOR AN INTERNAL COMBUSTION ENGINE

(71) Applicant: Mahle International GmbH, Stuttgart (DE)

(72) Inventors: Roland Lochmann, Marbach (DE); Bartek Lemm, Deizisau (DE)

(73) Assignee: Mahle International GmbH, Stuttgart (DE)

( * ) Notice: Subject to any disclaimer, the term of this patent is extended or adjusted under 35 U.S.C. 154(b) by 3 days.

(21) Appl. No.: 15/557,101

(22) PCT Filed: Mar. 10, 2016

(86) PCT No.: PCT/EP2016/055160
§ 371 (c)(1),
(2) Date: Sep. 9, 2017

(87) PCT Pub. No.: WO2016/142478
PCT Pub. Date: Sep. 15, 2016

(65) Prior Publication Data
US 2018/0051648 A1 Feb. 22, 2018

(30) Foreign Application Priority Data
Mar. 10, 2015 (DE) .................. 10 2015 003 039

(51) Int. Cl.
*F02F 5/00* (2006.01)
*F02F 1/00* (2006.01)
(Continued)

(52) U.S. Cl.
CPC ................ *F02F 1/004* (2013.01); *F02F 1/16* (2013.01); *F16J 10/04* (2013.01); *F02F 2001/006* (2013.01); *F02F 2001/008* (2013.01)

(58) Field of Classification Search
CPC ........ F02F 1/004; F02F 1/16; F02F 2001/008; F02F 2001/006; F16J 10/04
(Continued)

(56) References Cited

U.S. PATENT DOCUMENTS 4,791,891 A * 12/1988 Kubis .................... F02F 11/002
 123/193.2
4,986,230 A * 1/1991 Panyard ................. B21D 39/06
 123/193.2
(Continued)

FOREIGN PATENT DOCUMENTS

DE 1576714 A1 5/1970
DE 4343047 A1 6/1994
(Continued)

OTHER PUBLICATIONS

English abstract for DE-10121852.

*Primary Examiner* — Lindsay M Low
(74) *Attorney, Agent, or Firm* — Fishman Stewart PLLC

(57) ABSTRACT

An arrangement may include one of a cylinder liner or a cylinder bore formed in a crankcase of an internal combustion engine, a piston having a peripheral top land and being accommodated in the cylinder liner or cylinder bore, and an annular insert accommodated in the cylinder liner or cylinder bore and extending axially parallel to the piston top land. The cylinder liner or cylinder bore may have a radially inwardly-directed shoulder at an upper free end of the cylinder liner or cylinder bore. The annular insert may have along an upper peripheral free edge of the annular insert, distributed around a circumference of the annular insert, at least two beads or embossments located opposite one another and resting on the radially inwardly-directed shoulder.

20 Claims, 2 Drawing Sheets

(51) Int. Cl.
*F16J 10/04* (2006.01)
*F02F 1/16* (2006.01)

(58) Field of Classification Search
USPC .................................................. 123/193.2
See application file for complete search history.

(56) References Cited

U.S. PATENT DOCUMENTS

| | | | | |
|---|---|---|---|---|
| 6,164,260 | A * | 12/2000 | Bock ..................... | F02F 1/163 123/193.2 |
| 7,484,493 | B2 * | 2/2009 | Bischofberger .......... | F02F 1/00 123/193.2 |
| 2003/0071424 | A1 | 4/2003 | Chen et al. | |
| 2005/0279296 | A1 * | 12/2005 | Coney ..................... | F02B 77/11 123/41.84 |
| 2008/0150237 | A1 | 6/2008 | Bischofberger et al. | |
| 2013/0032117 | A1 * | 2/2013 | Worthington ........... | F02F 1/004 123/193.2 |
| 2015/0267635 | A1 * | 9/2015 | Genter ..................... | F02F 3/26 123/193.2 |
| 2016/0097340 | A1 * | 4/2016 | Morgan .................. | F02F 1/004 123/193.2 |

FOREIGN PATENT DOCUMENTS

| | | |
|---|---|---|
| DE | 4342183 A1 | 6/1995 |
| DE | 10121852 A1 | 11/2002 |
| DE | 10137548 A1 | 2/2003 |
| DE | 102006060330 | 6/2008 |

* cited by examiner

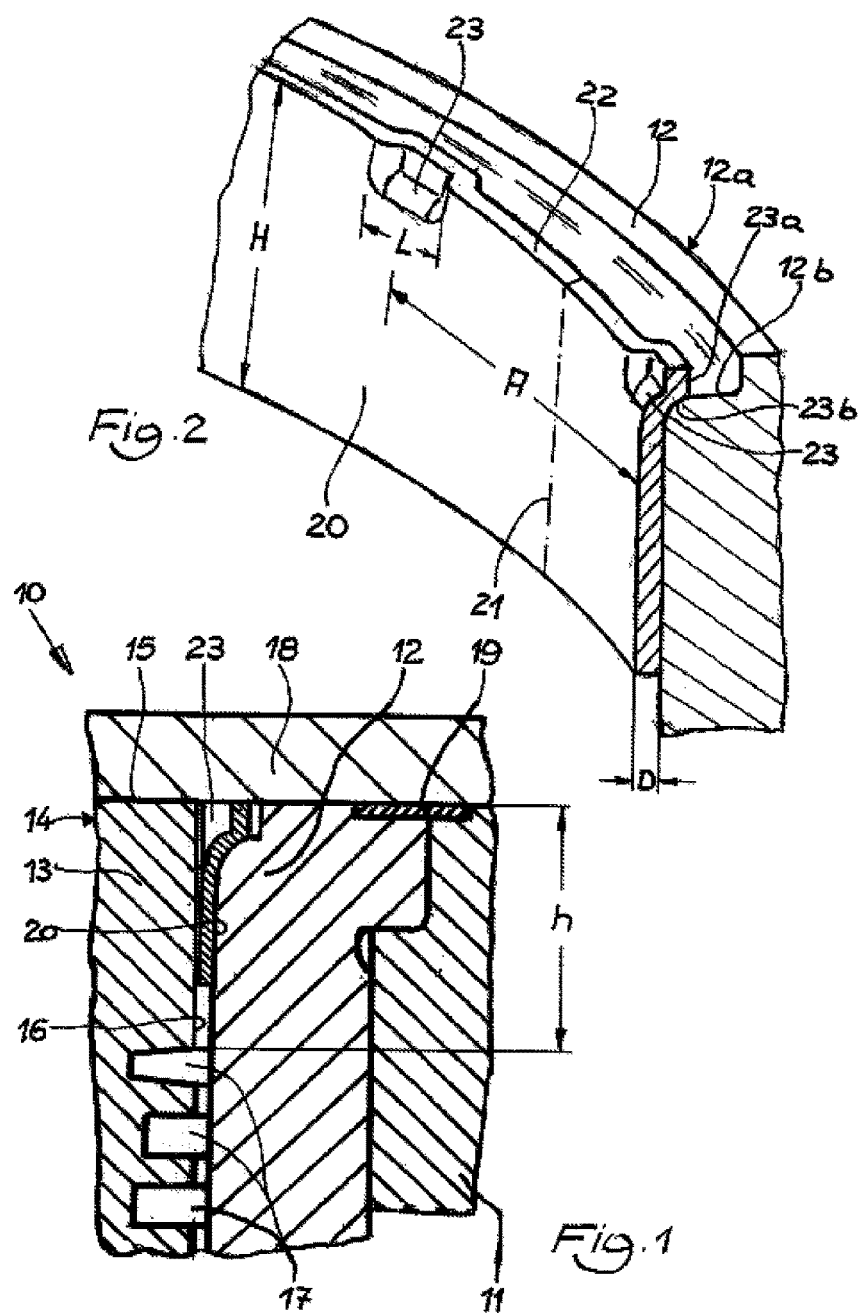

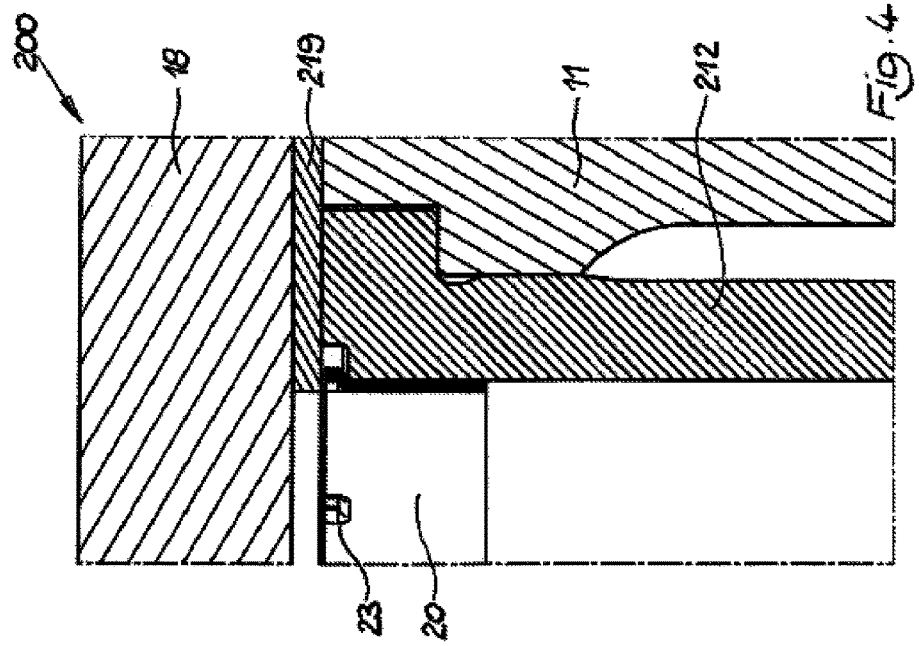
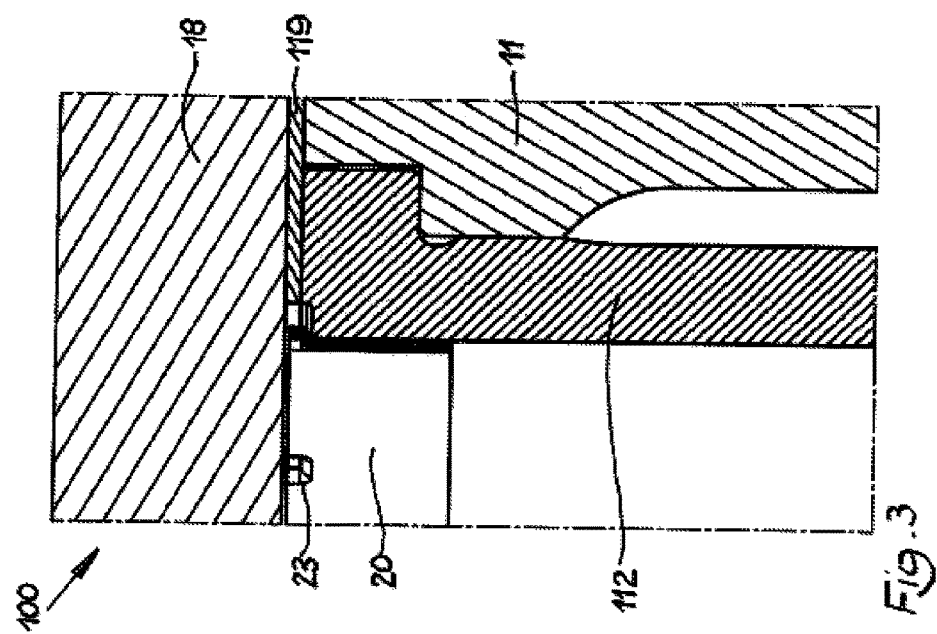

ARRANGEMENT FOR AN INTERNAL COMBUSTION ENGINE

CROSS-REFERENCE TO RELATED APPLICATIONS

This application claims priority to International Patent Application No. PCT/EP2016/055160, filed on Mar. 10, 2016, and German Patent Application No. DE 10 2015 003 039.6, filed on Mar. 10, 2015, the contents of both of which are incorporated herein by reference in their entireties.

TECHNICAL FIELD

The present invention relates to an arrangement comprising a cylinder liner or a cylinder bore formed in a crankcase of an internal combustion engine, a piston having a peripheral top land which is accommodated in the cylinder liner or cylinder bore, and an annular insert accommodated in the cylinder liner or cylinder bore and extending axially parallel to the piston top land.

BACKGROUND

A generic arrangement is known from DE 101 37 548 A1. Both the cylinder liner and the insert of this generic arrangement have corresponding peripheral chamfers along which the insert rests against the cylinder liner. However, the chamfers must be machined very accurately in order to ensure a sufficiently precise fit of the insert against the cylinder liner.

A further arrangement is known from DE 10 2006 060 330 A1. The insert described in that document is accommodated in a peripheral recess formed in the inner wall of the cylinder liner or the cylinder bore. On the one hand, this recess weakens the wall of the cylinder liner on account of the reduced wall thickness in this region and, on the other, such a recess increases the risk of cracking in this region on the formation of stress peaks related to notch effects.

The annular insert of such an arrangement serves to strip off oil carbon deposited on the piston top land during operation of the engine, and to prevent contact of the oil carbon with the running surfaces of the cylinder liner or cylinder bore.

SUMMARY

It is the object of the present invention to develop a generic arrangement in such a way that it can be produced in a simple manner without weakening the inner wall of the cylinder liner or increasing the risk of cracking.

The object is achieved in that the cylinder liner or cylinder bore has a radially inwardly-directed peripheral shoulder at its upper free end and in that the annular insert has along its upper peripheral free edge, distributed around its circumference, at least two beads or embossments located opposite one another and resting on the peripheral shoulder.

At the same time as eliminating the peripheral recess for the annular insert, the beads or embossments provided according to the invention contribute to reducing the stresses in the annular insert. Calculations using the finite element method (FEM) have shown that the comparable stresses in an annular insert with a flanged or chamfered shoulder at its upper peripheral free edge are two to three times as high as in the insert according to the invention.

Only the combination of these two advantages makes possible a thin-walled annular insert while avoiding a recess which weakens the wall of the cylinder liner and avoiding stress peaks which can lead to cracking.

Advantageous developments are apparent from the dependent claims.

The height of the shoulder may be zero, so that the beads or embossments provided according to the invention are located in a free space between cylinder liner or cylinder bore and the cylinder head or the cylinder head gasket covering them.

In a preferred development, the annular insert has more than two beads or embossments which are distributed uniformly around the circumference of the annular insert. The strength of the connection between insert and cylinder liner or cylinder bore is thereby further increased and the stability of the arrangement according to the invention optimized.

The distance between two beads or embossments is preferably greater than the outer peripheral length of each bead or embossment, in order to optimize the dimensional stability of the annular insert.

The beads or embossments are preferably substantially L-shaped or V-shaped in cross section and/or are substantially tub-shaped, box-shaped or rectangular in plan view. Beads or embossments shaped in this way can be produced especially simply by means of a stamping process.

The annular insert may be accommodated in the cylinder liner or cylinder bore by means of a press fit or with play, depending on the requirements of the individual case.

The wall thickness (D) of the annular insert is preferably 0.5 mm to 1.5 mm.

The annular insert may be configured, for example, as a closed ring. Such an insert can be formed in an especially simple manner technically by bending from a strip-shaped semifinished product, its free ends being connected rigidly to one another, for example by welding, bonding or soldering, so that a seam is produced.

In an alternative embodiment the annular insert may be configured as an open, pretensioned ring having a ring joint.

The annular insert and the cylinder liner or the crankcase are preferably produced from materials which have respective coefficients of thermal expansion preferably differing by less than 50%.

In the assembled state a cylinder head gasket and a cylinder head are further provided. The peripheral free edge of the insert can then be covered both by the cylinder head gasket and by the cylinder head, with or without play.

Exemplary embodiments of the invention are explained in more detail below with reference to the appended drawings. In the drawings, in a schematic representation which is not true to scale:

BRIEF DESCRIPTION OF THE DRAWINGS

FIG. 1 shows a first exemplary embodiment of an arrangement according to the invention in cross section;

FIG. 2 is an enlarged perspective representation of the annular insert shown in FIG. 1;

FIG. 3 shows in partial section a further exemplary embodiment of an arrangement according to the invention;

FIG. 4 shows in partial section a further exemplary embodiment of an arrangement according to the invention.

DETAILED DESCRIPTION

FIGS. 1 and 2 show a first exemplary embodiment of an arrangement 10 according to the invention. According to the invention, the arrangement 10 comprises a crankcase 11 with a cylinder liner 12 accommodated therein and a piston 13 accommodated in the cylinder liner 12.

Instead of the cylinder liner 12 a cylinder bore (not shown) formed in the crankcase 11 may, of course, also be provided. All the following explanations therefore also apply to such cylinder bores.

The piston 13 includes in known fashion a piston head 14 with a piston crown 15, a peripheral piston top land 16 and a peripheral ring portion with piston rings 17 accommodated in annular grooves.

The illustrated exemplary embodiment of the arrangement 10 according to the invention further comprises in known fashion a cylinder head 18 and a cylinder head gasket 19 arranged between the cylinder head 18 and the crankcase 11 or the cylinder liner 12. The cylinder head 18 covers both a portion of the cylinder liner 12 and an annular insert 20 (see below).

An annular insert 20 is arranged between the top land 16 of the piston 13 and the inner wall of the cylinder liner 12. The annular insert 20 is accommodated in the region of the top dead center position of the piston 13, that is, in the region where the motion of the piston 13 is reversed during operation of the engine.

The axial height H of the annular insert 20 is less than the axial height h of the piston top land 16. As a result, the entire upper region of the piston top land 16, which is located nearest to the combustion chamber and therefore is most exposed to the depositing of oil carbon, is wiped by the annular insert 20 during the reciprocating movement of the piston 13 with the engine in operation. It is thereby ensured that any oil carbon deposited is completely and reliably removed from the piston top land 36.

In the exemplary embodiment the annular insert 20 is formed as a stamping from sheet steel, the wall thickness D being 0.8 mm in the exemplary embodiment. The annular insert 20 may also be cut from sheet metal or steel sheet. The annular insert 20 may be formed by bending or as a deep-drawn part.

The annular insert may also be produced as a section of a preformed thin-walled tube.

In the exemplary embodiment the annular insert 20 is produced for a cylinder liner 12 with an internal diameter of 130 mm. The annular insert 20 in the exemplary embodiment is punched as a sheet steel strip and shaped into an open ring either in the same working cycle or subsequently. In the exemplary embodiment the free ends of the ring are joined, that is, rigidly connected to one another, preferably by welding, so that a seam 21 is produced, as indicated by the dot-dash line in FIG. 2.

The annular insert 20 may, of course, also be configured as an open, pretensioned ring having a ring joint (not shown).

According to the invention, the cylinder liner 12 has at its upper free end 12a a radially inwardly-directed peripheral shoulder 12b. According to the invention the annular insert 20 is provided along its upper peripheral free edge 22 with impressed beads or embossments (hereinafter beads) 23 distributed around its circumference. In the exemplary embodiment more than two beads 23 are provided, although only two are illustrated. According to the invention the beads 23 rest on the peripheral shoulder 12b. In this way the annular insert 20 is retained in the cylinder liner.

The beads 23 are distributed uniformly around the circumference of the annular insert. The distance A between two beads 23 is greater than the outer peripheral length L of each bead 23.

In the exemplary embodiment the beads 23 have a substantially L-shaped cross-section with a long side 23a and an indicated short side 23b. In the exemplary embodiment the beads 23 are substantially tub-shaped in plan view. In this configuration the beads can be impressed in an especially simple manner technically in the peripheral free edge 22 of the annular insert 20.

The annular insert 23 is inserted in the cylinder liner 12 from the top until the beads 23 rest on the peripheral shoulder 12b of the cylinder liner 12. In the exemplary embodiment the annular insert 20 is fitted in the cylinder liner 12 with play. The annular insert 20 may, of course, also be retained in the cylinder liner 12 by a press fit, especially if it is formed as an open, pretensioned ring having a ring joint.

In the exemplary embodiment the annular insert 20 and the cylinder liner 12 are produced from materials each having comparable coefficients of thermal expansion, so that during operation of the engine their thermal expansion has substantially the same value, with the result that the annular insert 20 is always securely retained in the cylinder liner independently of the temperatures prevailing in the internal combustion engine. In the exemplary embodiment, the cylinder liner 12 is produced from soft cast iron with a coefficient of thermal expansion of $12 \times 10^{-6} \times 1/\text{Kmm}$. In the exemplary embodiment, the annular insert 20 is produced from ferritic special steel with a coefficient of thermal expansion of $10.5 \times 10^{-6} \times 1/\text{Kmm}$.

FIG. 3 shows a further exemplary embodiment of an arrangement 100 according to the invention. The arrangement 100 corresponds substantially to the arrangement 10 according to FIG. 1, so that like components and structural elements are denoted by the same reference symbols; reference is made in this regard to the description relating to FIGS. 1 and 2. The essential difference is that the cylinder head gasket 119 covers the cylinder liner 112 almost completely and the cylinder head 18 covers only the peripheral free edge 22 of the annular insert 20.

FIG. 4 shows a further exemplary embodiment of an arrangement 200 according to the invention. The arrangement 200 corresponds substantially to the arrangement 10 according to FIG. 1, so that like components and structural elements are denoted by the same reference symbols; reference is made in this regard to the description relating to FIGS. 1 and 2. The essential difference is that the cylinder head gasket 219 covers both the cylinder liner 112 and the peripheral free edge 22 of the annular insert 20.

The invention claimed is:

1. An arrangement comprising:
   one of a cylinder liner or a cylinder bore formed in a crankcase of an internal combustion engine;
   a piston having a peripheral top land accommodated in the one of the cylinder liner or the cylinder bore; and
   an annular insert accommodated in the one of the cylinder liner or the cylinder bore and extending axially parallel to the piston top land,
   wherein the one of the cylinder liner or the cylinder bore has a radially inwardly-directed shoulder at an upper free end of the one of the cylinder liner or the cylinder bore, and the annular insert has along an upper peripheral free edge of the annular insert, distributed around a circumference of the annular insert, at least two beads or embossments located opposite one another and resting on the radially inwardly-directed shoulder, and
   wherein the at least two beads or embossments are located on the upper peripheral free edge of the annular insert, and the at least two beads or embossments protrude over the upper free end of the one of the cylinder liner or the cylinder bore and into a gap between the annular insert and the one of the cylinder liner and the cylinder bore.

2. The arrangement as claimed in claim 1, wherein the annular insert has more than two beads or embossments distributed uniformly around the circumference of the annular insert.

3. The arrangement as claimed in claim 1, wherein a distance between two of the at least two beads or embossments is greater than an outer peripheral length of each bead or embossment.

4. The arrangement as claimed in claim 1, wherein the at least two beads or embossments are substantially L-shaped or V-shaped in cross section.

5. The arrangement as claimed in claim 1, wherein the at least two beads or embossments are substantially tub-shaped, box-shaped or rectangular in plan view.

6. The arrangement as claimed in claim 1, wherein the annular insert is accommodated in the one of the cylinder liner or the cylinder bore by a press fit or with play.

7. The arrangement as claimed in claim 1, wherein a wall thickness of the annular insert is not more than 1.5 mm.

8. The arrangement as claimed in claim 1, wherein the annular insert is configured as a closed ring.

9. The arrangement as claimed in claim 7, wherein the annular insert is formed by bending from a strip-shaped semifinished product and the free ends thereof are connected rigidly to one another by a seam.

10. The arrangement as claimed in claim 8, wherein the free ends are one of welded, bonded, or soldered to one another.

11. The arrangement as claimed in claim 1, wherein the annular insert is configured as an open, pretensioned ring having a ring joint.

12. The arrangement as claimed in claim 1, wherein the annular insert and the cylinder liner or the crankcase are produced from materials which have respective coefficients of thermal expansion differing by less than 50%.

13. The arrangement as claimed in claim 1, further comprising a cylinder head gasket and a cylinder head, wherein the peripheral free edge of the annular insert is covered by the cylinder head gasket with or without play.

14. The arrangement as claimed in claim 1, further comprising a cylinder head gasket and a cylinder head, wherein the peripheral free edge of the annular insert is covered by the cylinder head with or without play.

15. The arrangement as claimed in claim 1, wherein the at least two beads or embossments are substantially L-shaped or V-shaped in cross section.

16. The arrangement as claimed in claim 1, wherein the at least two beads or embossments are substantially tub-shaped, box-shaped or rectangular in plan view.

17. An arrangement comprising:
one of a cylinder liner or a cylinder bore formed in a crankcase of an internal combustion engine;
a piston having a peripheral top land accommodated in the one of the cylinder liner or the cylinder bore; and
an annular insert accommodated in the one of the cylinder liner or the cylinder bore and extending axially parallel to the piston top land;
wherein the one of the cylinder liner or the cylinder bore has a radially inwardly-directed shoulder at an upper free end of the one of the cylinder liner or the cylinder bore, and the annular insert has along an upper peripheral free edge of the annular insert, distributed uniformly around a circumference of the annular insert, at least two beads or embossments located opposite one another and resting on the radially inwardly-directed shoulder,
wherein a distance between two of the at least two beads or embossments is greater than an outer peripheral length of each of the at least two beads or embossments, and
wherein the at least two beads or embossments are located on the upper peripheral free edge of the annular insert, and the at least two beads or embossments protrude over the upper free end of the one of the cylinder liner or the cylinder bore and into a gap between the annular insert and the one of the cylinder liner and the cylinder bore.

18. The arrangement as claimed in claim 17, wherein the annular insert is configured as one of a closed ring or an open, pretensioned ring having a ring joint.

19. The arrangement as claimed in claim 17, further comprising a cylinder head gasket and a cylinder head, wherein the peripheral free edge of the annular insert is covered by one of the cylinder head gasket or the cylinder head with or without play.

20. An arrangement comprising:
one of a cylinder liner or a cylinder bore formed in a crankcase of an internal combustion engine;
a piston having a peripheral top land accommodated in the one of the cylinder liner or the cylinder bore; and
an annular insert accommodated in the one of the cylinder liner or the cylinder bore and extending axially parallel to the piston top land,
wherein the one of the cylinder liner or the cylinder bore has a radially inwardly-directed shoulder at an upper free end of the one of the cylinder liner or the cylinder bore, and the annular insert has along an upper peripheral free edge of the annular insert, distributed around a circumference of the annular insert, at least two beads or embossments located opposite one another and resting on the radially inwardly-directed shoulder, and
wherein the at least two beads or embossments protrude over the upper free end of the one of the cylinder liner or the cylinder bore and into a gap between the annular insert and the one of the cylinder liner and the cylinder bore.

* * * * *